US005233365A

United States Patent [19]

Uemura et al.

[11] Patent Number: 5,233,365

[45] Date of Patent: Aug. 3, 1993

[54] DOT-MATRIX PRINTER HAVING INTERCHANGEABLE LINE HEAD AND MOVING HEAD TECHNOLOGIES

[75] Inventors: Hisashi Uemura; Kenichi Fujii; Setsuo Sasabe, all of Hyogo, Japan

[73] Assignee: Kanzaki Paper Mfg. Co., Ltd., Tokyo, Japan

[21] Appl. No.: 645,838

[22] Filed: Jan. 25, 1991

[30] Foreign Application Priority Data

Jan. 26, 1990 [JP] Japan .................................. 2-17469

[51] Int. Cl.[5] .......................... B61J 2/32; G01D 9/00

[52] U.S. Cl. ................................ 346/1.1; 346/76 PH; 400/121; 400/124

[58] Field of Search ........................... 346/76 PH, 1.1; 400/120, 121, 124

[56] References Cited

U.S. PATENT DOCUMENTS

| | | | |
|---|---|---|---|
| 3,893,558 | 7/1975 | Fulton et al. | 101/93.05 |
| 4,069,485 | 1/1978 | Martin | 346/75 |
| 4,524,368 | 6/1985 | Inui et al. | 346/76 PH |
| 4,536,772 | 8/1985 | Isogai | 346/76 PH |
| 4,737,041 | 4/1988 | Nakayama | 400/121 |
| 4,738,553 | 4/1988 | Uemura et al. | 346/76 PH |
| 4,786,917 | 11/1988 | Hauschild et al. | 346/76 PH |

FOREIGN PATENT DOCUMENTS

| | | |
|---|---|---|
| 0304916 | 3/1989 | European Pat. Off. . |
| 0349812 | 1/1990 | European Pat. Off. . |

*Primary Examiner*—Benjamin R. Fuller
*Assistant Examiner*—Huan Tran
*Attorney, Agent, or Firm*—Cushman, Darby & Cushman

[57] ABSTRACT

A dot-matrix printer which operates as a line head printer and is capable of reading line head printer print data and moving head printer print data. A memory stores print data. A series of clock pulses are generated and a shift register reads a portion of the print data from the memory. Upon receipt of a pre-determined clock pulse, the shift register writes the group of print data to a first latch register in a series of latch registers. The print data in each latch register is then written to a succeeding latch register. Upon receipt of a pre-determined clock pulse and in accordance with the print data, heating elements heat specific dot elements in a group of dot elements thus printing an equivalent of one print line. The print sheet is then advanced a distance equivalent to a print line comprising the group of dot elements and the process is repeated as required. The latch registers of the disclosure may be eliminated and replaced with shift registers, thus the print data is read directly by the shift registers and therefore the operating speed is increased.

1 Claim, 2 Drawing Sheets

DOT-MATRIX PRINTER HAVING INTERCHANGEABLE LINE HEAD AND MOVING HEAD TECHNOLOGIES

BACKGROUND OF THE INVENTION

1. Field of the Invention

The invention relates to dot-matrix printers, and more particularly to a line head printer having dot-matrix pins or heating elements fixed across the width of a print sheet.

2. Description of the Related Art

There are two types of dot-matrix printers: a line head printer having a fixed print head and a moving head printer having a print head which shuttles across the print sheet and is provided with a plurality of dot-matrix pins or heating elements arranged in an order perpendicular to the width of a print sheet.

The line head printer is provided with no head moving mechanism and has a simple mechanical structure. However, the moving head printer requires a head moving mechanism and has difficulty increasing its print speed due to mechanical limitations. Thus, the line head printer is faster.

A line head printer has a plurality of rows, each consisting of dot elements, and moves a print sheet past the plurality of rows every time the dot elements in the plurality of rows have been energized. For example, suppose that a line head printer contains n rows equivalent to one print line where each row consists of a plurality of dot elements. Print data is input for every row until n rows of data (i.e. one print line) can be printed. Therefore, the line is printed without moving the print sheet. The line head printer then scrolls the print sheet forward a distance equivalent to one print line (i.e. n rows) after the n rows of data have been printed and repeats the process until all data has been printed.

The process of printing data with a moving head printer is somewhat different. The end of the moving head has a plurality of dots, m, which is equivalent to a segment of a print line. Print data equivalent to the m dots is input to an end of the moving head and the dots in the moving head are energized thus printing this segment of the print line. The moving head then moves forward horizontally across the print sheet a distance equivalent to the segment of the print line. Data equivalent to the m dots is again input to the moving head and the above process is repeated until an end of the line is reached. Then, the printer scrolls the print sheet forward to the next line and the entire process is repeated until all data has been printed.

Many printers use a combination of both the line head and moving head printer technologies. Although interchangeability between the function of a line head printer and that of a moving head printer is desireable, to date, no such interchangeability has been available. Therefore, print data for a line head printer cannot be used by the moving head printer and vice-versa

SUMMARY OF THE INVENTION

An object of this invention is to provide a printer having interchangeable line head and moving head technologies.

As in the conventional line head printer, the present invention comprises a line head printer that has a plurality of rows, each consisting of dot elements. The present invention further comprises a memory for arranging and storing line head printer print data in a specific pattern equivalent to one print line. A shift register reads the print data from the memory and forwards the print data to a series of latch registers. The latch registers are further connected to a plurality of gate registers and provide the print data to the gate registers. The gate registers are connected to a plurality of heating bodies which are further connected to corresponding dot elements in the line head printer. When a series of strobe signals are received by the gate registers, the gate registers energize the heating bodies to heat the appropriate dot elements in accordance with the print data stored in the latch registers. Therefore, as in the conventional line head printer, print data equivalent to an entire print line is printed. The line head printer then scrolls the print sheet forward a distance equivalent to one print line (i.e. n rows) after the print line has been printed and repeats the process until all data has been printed.

Unlike conventional line head printers, the present invention can be arranged to read and print moving head printer data. One way of attaining this capability is to eliminate the single shift register and the latch registers and replace these registers with a plurality of shift registers. Upon receiving the moving head printer print data, the memory arranges the data in a specific pattern equivalent to one print line and forwards this data directly to the shift registers in groups equivalent to segments of a print line as similar to the process in a conventional moving head printer. When the data representing the entire print line has been received by the shift registers, the gate circuits energize the heating bodies to heat the appropriate dot elements in accordance with the print data stored in the shift registers. When the line is printed, the printer scrolls the print sheet forward to the next line and the process is repeated until all of the data has been printed.

BRIEF DESCRIPTION OF THE DRAWINGS

Preferred embodiment(s) of the invention will be described in detail with reference to the drawings wherein like reference numerals denote like or corresponding parts throughout.

DETAILED DESCRIPTION OF THE PREFERRED EMBODIMENTS

Figure 1:
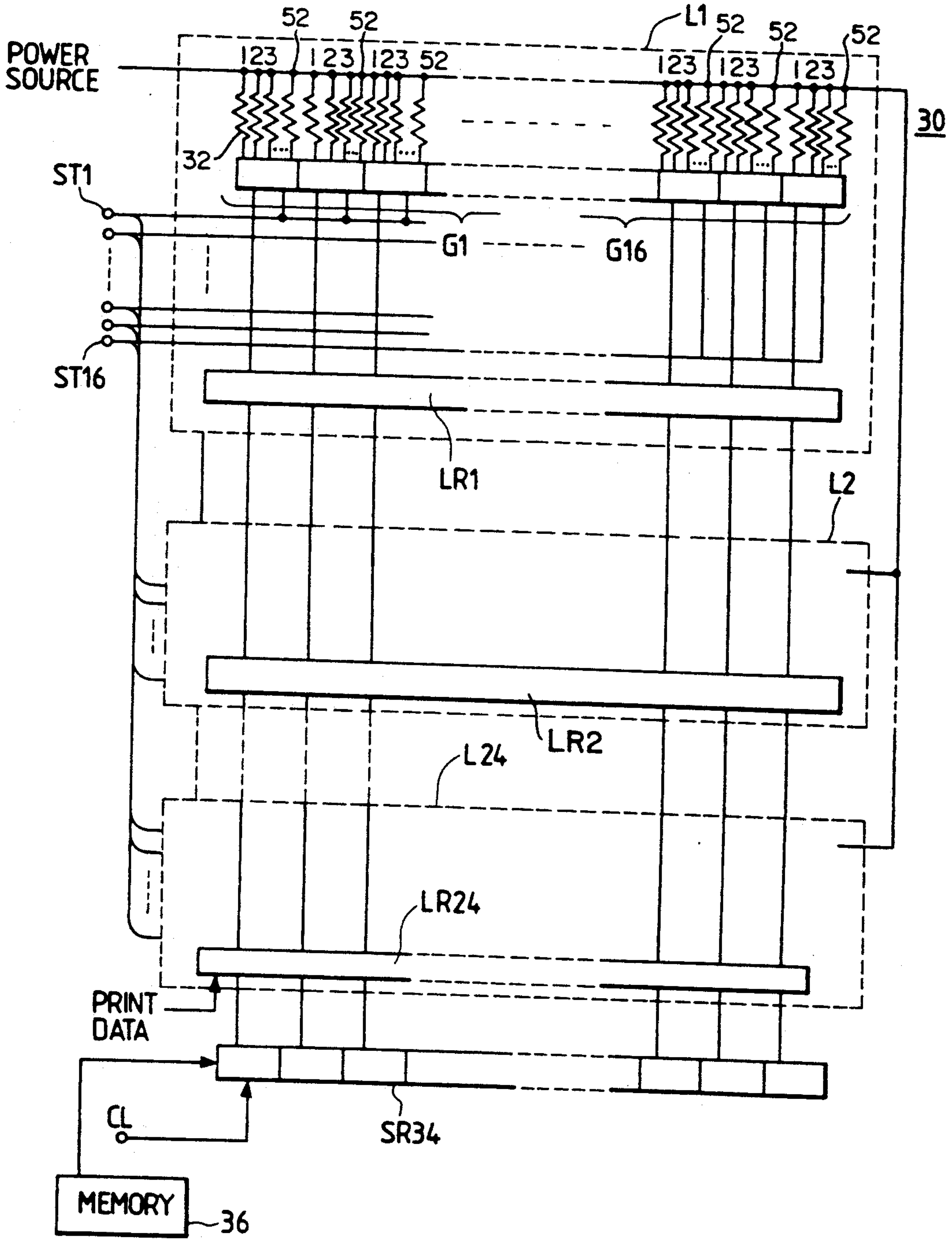
FIG. 1 is a block diagram showing an embodiment of the invention.

FIG. 1 shows an embodiment of the invention. A fixed thermal print head 30 has 24 rows, each row having 832 dots extending in the width direction of a print sheet (hereinafter referred to as "dot row"). This printer is also interchangeable with a type of moving head printer that forwards the print sheet in a line feed direction every 24 dots. Blocks L1 to L24 each form a single row of dots. Each block has heating bodies 32 for heating respective dot elements. A first end of each heating body 32 is commonly connected to a first terminal of a power supply 38. A second end of each heating body 32 is connected to a second end of the power supply 38 through gate circuits G1 to G16 respectively, each gate circuit grouping 52 dots and thus grouping 52 heating bodies. Blocks L1 to L24 include respective latch registers LR1 to LR24, each latch register accommodating 832 bits. The output of a preceding latch register is connected to the input of a succeeding latch register, and the latch signal inputs of each latch register are connected to the latch signal output of a shift register SR34. The plurality of latch registers LR1 to LR24 is also connected in series with the shift register SR 34.

A memory 36 reads data for every single dot row and develops the data of a single print line into a pattern of 24×832 dots and stores this developed print data. Memory 36 also inputs the print data to the shift register SR34 which not only reads serial print data but also shifts the read data in accordance with a clock pulse CL.

Figure 2:
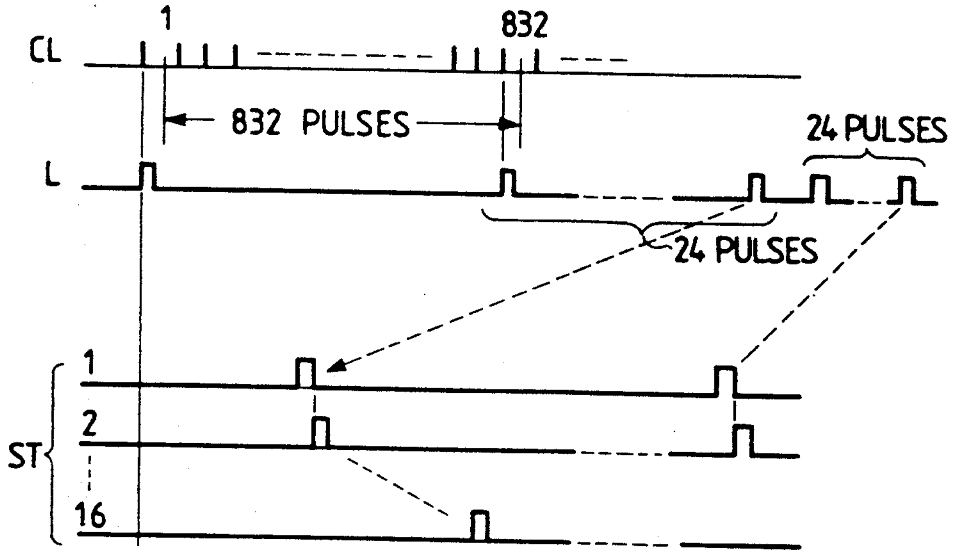
FIG. 2 is a timing chart illustrative of the operation of the embodiment shown in FIG. 1.

FIG. 2 is a timing chart showing the operation of the fixed thermal print head 30 as shown in FIG. 1. In FIG. 2, a clock pulse CL signals the shift register SR34 to read the print data from the memory 36 and to shift the read data. When an 832nd clock pulse is generated, the print data equivalent to a single dot row is written to the shift register 34 in the form of developed dot pattern.

When a latch signal L is input upon generation of the 832nd clock pulse, the print data is written from the shift register to the first latch register and the print data of each latch register is written to its succeeding latch register. When this operation of updating the content of a succeeding latch register with the contents of a preceding latch register is repeated 24 times, each block of the print head has completed its read operation. At this time, a total of 16 strobe signals ST (FIG. 2) are applied sequentially through strobe terminals ST1 to ST16 to gate circuits G1 to G16 of each of the blocks L1 to L24, respectively. Each gate circuit is turned on or off in accordance with the output of each bit of the respective latch register to which the gate circuit is connected, thus energizing the corresponding heating bodies 32 to heat the dots and thus print the data. The printing of the data consisting of a pattern of 24×832 dots, equivalent to a single print line, is terminated upon application of the 16th strobe signal which triggers the printer to forward the print sheet by the single print line. The above operation is repeated to print the data of additional print lines.

Figure 3:
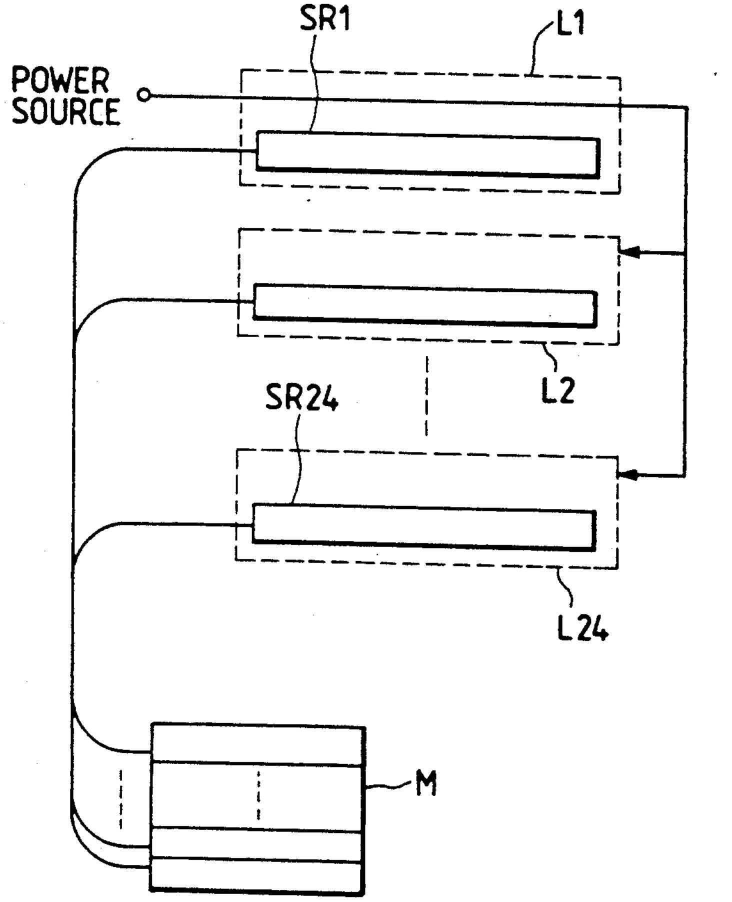
FIG. 3 is a block diagram of an alternative embodiment of the invention.

FIG. 3 shows another embodiment of the invention. This embodiment has the following arrangement: Shift registers SR1 to SR24, instead of latch registers LR1 to LR24 as in the previous embodiment (FIG. 1), are disposed in the blocks L1 to L24, respectively. Print data stored in the memory 36 is input to the blocks in 24 dot groups at every clock pulse CL. The dot groups are segments of an entire print line as in a conventional moving head printer. The input of the print data equivalent to a single print line is terminated with the 832nd clock pulse, therefore, the print data equivalent to a single print line is input to the print head much faster (i.e. 24 times faster) than in the first embodiment.

Both embodiments signal each block to energize a group of 52 dot elements at a time and complete the printing of the single print line data with the 16th strobe signal.

Also, even though the print data is developed into a pattern of 24×832 dots in the above embodiments, the arrangement for writing the print data to the memory 36 is optional. For example, a memory capable of receiving print data equivalent to a single print line which is developed into 24 dots segments sequentially transmitted as in a moving head printer can be used. On the other hand, a memory capable of receiving print data equivalent to a single print line which is developed into each dot row and serially transmitted as in a line head printer can be implemented. Therefore, a suitable memory can be selected according to the printer application.

According to the invention, the fixed print head consisting of a plurality of dot rows can print the data equivalent to a plurality of dot rows (i.e. one print line) at one time. Requiring no moving mechanism, the structure of the print head is not only mechanically simple but also is free from mechanical speed restrictions. Furthermore, by consisting of a plurality of dot rows, the print head according to the present invention can accommodate input of the moving head printer print data as well.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A printing method using a dot-matrix printer comprising the steps of:

storing print data in a memory;

generating a series of clock pulses and writing predetermined amounts of said print data from said memory into each shift register of a series of shift registers in accordance with said series of clock pulses, said writing continuing until all said shift registers are full;

heating a plurality of dot elements in accordance with said print data upon generation of a predetermined clock pulse within said series of clock pulses; and advancing a print sheet a distance equivalent to a print line comprising said plurality of dot elements.

* * * * *